(12) United States Patent
Huitema et al.

(10) Patent No.: US 8,873,225 B2
(45) Date of Patent: Oct. 28, 2014

(54) ELECTRONIC APPARATUS WITH A FLEXIBLE DISPLAY HAVING A BODY ENABLING FURTHER FUNCTIONALITY

(75) Inventors: Hjalmar Edzer Ayco Huitema, Veldhoven (NL); Volker Barnhart Verschoor, Delft (NL); Rik Kruidhof, Eindhoven (NL)

(73) Assignee: Creator Technology B.V., Breda (NL)

( * ) Notice: Subject to any disclaimer, the term of this patent is extended or adjusted under 35 U.S.C. 154(b) by 1022 days.

(21) Appl. No.: 12/989,339

(22) PCT Filed: Apr. 22, 2009

(86) PCT No.: PCT/NL2009/050212
§ 371 (c)(1),
(2), (4) Date: Feb. 24, 2011

(87) PCT Pub. No.: WO2009/131447
PCT Pub. Date: Oct. 29, 2009

(65) Prior Publication Data
US 2011/0148797 A1    Jun. 23, 2011

Related U.S. Application Data

(60) Provisional application No. 61/047,037, filed on Apr. 22, 2008.

(51) Int. Cl.
*H05K 5/00*      (2006.01)
*G06F 1/16*      (2006.01)
*G09F 9/30*      (2006.01)

(52) U.S. Cl.
CPC .............. *G06F 1/1656* (2013.01); *G09F 9/301* (2013.01); *G06F 1/1615* (2013.01); *G06F 1/1652* (2013.01); *G06F 1/1643* (2013.01)

USPC . 361/679.01; 345/168; 345/169; 361/679.03; 361/679.09; 361/679.11; 361/679.15; 361/679.2

(58) Field of Classification Search
USPC ........ 345/168, 169, 173; 361/679.01, 679.03, 361/679.09, 679.11, 679.15, 679.2, 679.32
See application file for complete search history.

(56) References Cited

U.S. PATENT DOCUMENTS 4,919,259 A * 4/1990 Beaulieu ...................... 206/45.2
6,016,176 A * 1/2000 Kim et al. ........................ 349/84

(Continued)

FOREIGN PATENT DOCUMENTS

EP    1 635 313 A    3/2006
JP    H11-283440     10/1999

(Continued)

OTHER PUBLICATIONS

International Search Report dated Sep. 17, 2009 for PCT/NL2009/050212.

(Continued)

*Primary Examiner* — Robert J Hoffberg
*Assistant Examiner* — Hung Dang

(57) ABSTRACT

The invention relates to an electronic apparatus 10 comprising a body 14 about which a collapsible flexible display 16 is wrapped. In accordance with the invention the body 14 comprises an area 16a on which the flexible display is conceived to overlay in its extended state. This area may be provided with illumination unit for enabling a front illumination of the display in use and/or with a touch-sensitive area 13 for enabling touch functionality in use.

12 Claims, 8 Drawing Sheets

(56) References Cited

U.S. PATENT DOCUMENTS

| | | |
|---|---|---|
| 6,380,921 B2 | 4/2002 | Nakamura |
| 2001/0043188 A1 | 11/2001 | Nakumura |
| 2006/0146488 A1 | 7/2006 | Kimmel |

FOREIGN PATENT DOCUMENTS

| | | |
|---|---|---|
| JP | 2006-287982 | 10/2006 |
| TW | 200632806 A | 9/2006 |
| WO | WO 2006/085271 A2 | 8/2006 |
| WO | WO 2006/126158 A | 11/2006 |
| WO | WO 2007/077649 A1 | 7/2007 |
| WO | WO 2007/145518 A | 12/2007 |

OTHER PUBLICATIONS

Japan Patent Office, English Translation of Office Action, Patent Application Serial No. 2011-506215, Nov. 6, 2012, Japan.

European Patent Office, Search Report, Patent Application Serial No. 12178571.1, Apr. 7, 2014, Europe.

European Patent Office, Search Report, Patent Application Serial No. 12178572.9, Apr. 7, 2014, Europe.

European Patent Office, Search Report, Application No. 09735376.7, Apr. 10, 2014, Europe.

* cited by examiner

ELECTRONIC APPARATUS WITH A FLEXIBLE DISPLAY HAVING A BODY ENABLING FURTHER FUNCTIONALITY

FIELD OF THE INVENTION

The invention relates to an electronic apparatus comprising a flexible display arrangement.

BACKGROUND OF THE INVENTION

An embodiment of the electronic apparatus as set forth in the opening paragraph is known in the art. For example, the flexible display may be depressible for enabling a touch functionality. The touch functionality may be implemented as a resistive circuit. Commonly, a touch panel is added on top of a depressible display on the viewer' side, which may be implemented using an adhesive. In general, touch functionality based on a resistive circuit comprises a flexible top layer and a substantially rigid bottom layer, which may be separated by insulating dots and air cavities. An inside surface of each layer may be coated with a transparent electrical conductor, which can be ITO or another suitable electrically conducting layer. The top substrate is usually implemented as a plastic foil, for example a PET-film of about 180 micrometer thickness, whereas a bottom substrate may be implemented either from glass or a plastic foil, like PET-film. Depressing the flexible top sheet creates an electrical contact between the conducting layers, essentially closing a switch of the resistive circuit. The conducting layers may be regarded as resistive layers, as the sheet resistances are in the order of 200-1000 Ohm/m. Most touch panels are of an analog-type—also called a 4-wire type. In this type of touch panel, conducting tracks and bus bars are connected to the upper and lower side of the top-electrode layer and additional conducting tracks and bus bars are connected to the left and right side of the bottom-electrode layer. The four resulting conducting leads are then used to determine the location at which the two-electrode layers are shorted by a touch action. The control electronics alternate voltage between the layers to obtain x and y coordinates, using a suitable electric circuit. Also, electrical circuits comprising more than 4 wires may be used for implementing resistive touch functionality.

SUMMARY OF THE INVENTION

It is a disadvantage of the known touch panel that it has increased thickness, which is not suitable with a concept of collapsible flexible display. Usually, the top layer is coated to allow for anti-reflection, anti-glare, anti-smudge, etc. A gap between the two electrodes is generally filled with air and insulating structures. In cases where the touch panel is placed on top of the display in a direction towards the viewer, the coating may reduce optical performance of the display due to adverse effects arising from Newton rings or increased reflection of light. These effects lead to degradation of optical clarity of the display. In addition, the thickness of conventional touch panels exceeds 300 micro meters. For rollable flexible displays such thickness is not allowable, as the minimum roll radius will exceed 6 mm. Adding a touch panel with a thickness of 300 micrometer to a flexible display may in some cases increase the overall thickness to at least 425 micrometer, resulting in a roll radius exceeding 21 mm.

It is an object of the invention to provide an electronic apparatus comprising a collapsible flexible display having a suitable further functionality, like touch functionality and/or illumination functionality, while preserving minimal thickness of the flexible display.

To this end the electronic apparatus according to the invention comprises:
 a body;
 at least partially collapsible flexible display conceived to overlay a portion of the body in an extended state; wherein
 the portion of the body is arranged with means conceived to interact with the display in said extended state for adding a further functionality thereto.

The means may be implemented as an electronic, mechanical, magnetic or other suitably operable unit.

In a particular example, the means are arranged as a touch sensitive unit. More particularly the means relates to an illumination unit. It is found that when the collapsible flexible electronic display is arranged to wrap about the body of the electronic apparatus the touch functionality can be advantageously implemented on a portion of the body conceived to provide mechanical support to a portion of the flexible display in use. It will be appreciated that various implementations of the touch sensitive portion of the body are envisaged. First, it is possible that the collapsible flexible display is arranged to be merely partially extend from its storage position, for example for preview purposes. The portion of the body having touch functionality may have dimensions sufficient to support the said partially extended area of the flexible display. Secondly, it is possible that the flexible display in it fully extended state has dimensions comparable with dimensions of the body. In this case the portion of the body arranged with touch sensitivity may substantially match an overall dimension of one face of the body.

Due to the fact that the touch sensitivity functionality is integrated in the body of the electronic apparatus, no additional layers are added to the flexible display foil. This has the advantage that the minimal thickness of the collapsible flexible display is preserved while touch functionality is enabled. It will be appreciated that any suitable concept may be used for enabling touch functionality including, but not limited to resistive means, electromagnetic means, pressure sensitive means, etc.

In an embodiment of the electronic apparatus according to the invention the apparatus further comprises one or more substantially rigid flaps arranged for supporting a portion of the flexible display in its extended state, said one or more rigid flaps comprising displacement means for positioning the portion of the flexible display on the portion of the body when in use.

In this embodiment the rigid flaps provide mechanical support to the flexible display. The rigid flaps are preferably arranged with displacement means, for example hinged portions which can rotate 180 degrees. The hinge connected to the body may be further attached to a cylinder that can then be rotated for another 180 degrees thereby placing the display on top of the touch-sensitive portion of the body. Alternatively, the displacement means comprise arms, sliding bars or any other suitable mechanical construction for positioning a suitable portion of the flexible display on the touch-sensitive portion of the body.

In a further embodiment of the electronic display according to the invention the said one on more flaps are provided with fixing means for retaining the portion of the flexible display on the portion of the body. This is advantageous for preventing damage to the display surface during actuation of the touch-sensitive unit integrated in the body. In particular, when the touch-sensitive unit is arranged to operate based on pressure detection or using a resistive circuit, it is advantageous to prevent undesired sliding of the flexible display about the body. Preferably, means for retaining comprise indications in hinges, magnets, or other suitable means embedded in the body.

In a further embodiment of the electronic apparatus according to the invention the displacement means comprises a plurality of hinges arranged in mutual sequence. The plurality of sequential hinges are advantageously used for protecting the collapsible flexible display from excessive bending. For example, when a sequence of hinges is positioned next to the body of the electronic apparatus, the hinges closest to the body restrict the curvature of the display to a predefined minimum radius. Preferably, such restriction is implemented in two directions, thereby allowing the display to be placed over the touch-sensitive area. Preferably, the hinges extend along a major part of the display in a direction transverse to a direction of the display's extension. This has an advantage in that the curvature of the display in the display extension direction is restricted while the display is kept substantially flat in the transverse direction.

In a further embodiment of the electronic apparatus according to the invention the flaps are slidably arranged with respect to the body. For example, the flaps may be arranged resembling a book and comprising a first portion and a second portion, said first portion and said second portion being slidable in a step-wise way. This embodiment has an advantage that at the first step the first portion may be used to allow a preview. When the user decides to use the full screen, at the second step the first portion can be displaced further to allow observing of the second portion as well. Preferably, the touch-interface is incorporated in these sliding portions.

In a still further embodiment of the electronic apparatus according to the invention said one or more flaps are arranged to be positioned at an oblique angle with respect to the body in use. In this particular embodiment the body additionally functions as a stand for the flexible display improving user friendliness of the viewing functionality. It will be appreciated that in this embodiment the touch functionality embedded in the body should be based on contact-less means, like EM means or other proximity detection means.

In a further embodiment of the electronic display according to the invention the apparatus further comprises a substantially flexible backing unit conceived for receiving the flexible display, said backing unit having a preference for straightening in use and comprising means for positioning a portion of the flexible display on the portion of the body in use. This embodiment has an advantage that the flexible backing unit serves for flattening the display and for protecting its back surface, which is particularly advantageous because the back surface may be conceived to come into mechanical contact with the touch-sensitive portion of the body. Preferably, the backing unit is also enabled to be displaced with respect to the body for suitable positioning of the display. For example, means for positioning may be provided which may comprise a hinge for rotating the backing unit with respect to the body.

In a further embodiment of the electronic apparatus according to the invention, an active area of the flexible display is arranged on a surface facing outwardly with respect to the body. This embodiment has an advantage that space is saved by enabling the user to wrap the flexible display around the body with the display's active area positioned on the outside. This functionality enables use of the touch-sensitive electronic apparatus in a compact, wrapped-up configuration. Also in this embodiment suitable means for retaining the display on the touch-sensitive portion of the body are envisaged. Such means for positioning may relate to indications in the hinges or to magnets, for example.

In a further embodiment of the electronic display according to the invention, wherein the flexible display is accommodated in one or more displaceable flaps and wherein the portion of the body is arranged with means conceived to interact with the display in the extended state, the means comprises an illumination unit conceived to cooperate with said flaps and constructed for enabling a front lighting of the flexible display in said extended state.

It is found to be advantageous to provide one or more light sources, which may be integrated in the body of the electronic apparatus and to couple light emanating from the light sources into a suitable light guide integrated into the flap when the flap is positioned on top of the portion. In this way a front surface of the flexible display may be illuminated. It will be appreciated that the illumination functionality may be combined with the touch-sensitive functionality. Further details of this embodiment are discussed with reference to FIG. 7.

In a further embodiment of the electronic display according to the invention the illumination unit is displaceable with respect to the portion of the body of the electronic apparatus. Also this embodiment may be combined with the touch-sensitive functionality. Preferably, the displacement is enabled between a substantially hidden positioned and a substantially protruded position. Advantageously, provided the flaps of the electronic device are displaceable about its stationary body by means of suitable displacement means, like hinges, the illumination unit may be displaced from the hidden position to the protruded position by mechanically coupling them to said displacement means. In this case the displacement of the illumination unit is substantially synchronized with the rotation of the flaps about the body. Further details of this embodiment are discussed with reference to FIG. 8. This embodiment has an advantage that no power lines or light sources need to be integrated into a flap.

These and other details of the invention will be further discussed with reference to drawings, wherein like reference signs relate to like components. It will be appreciated that the drawings are used for illustrative purposes only and may not be used to limit the scope of the invention in any way.

DETAILED DESCRIPTION OF THE DRAWINGS

Figure 1:
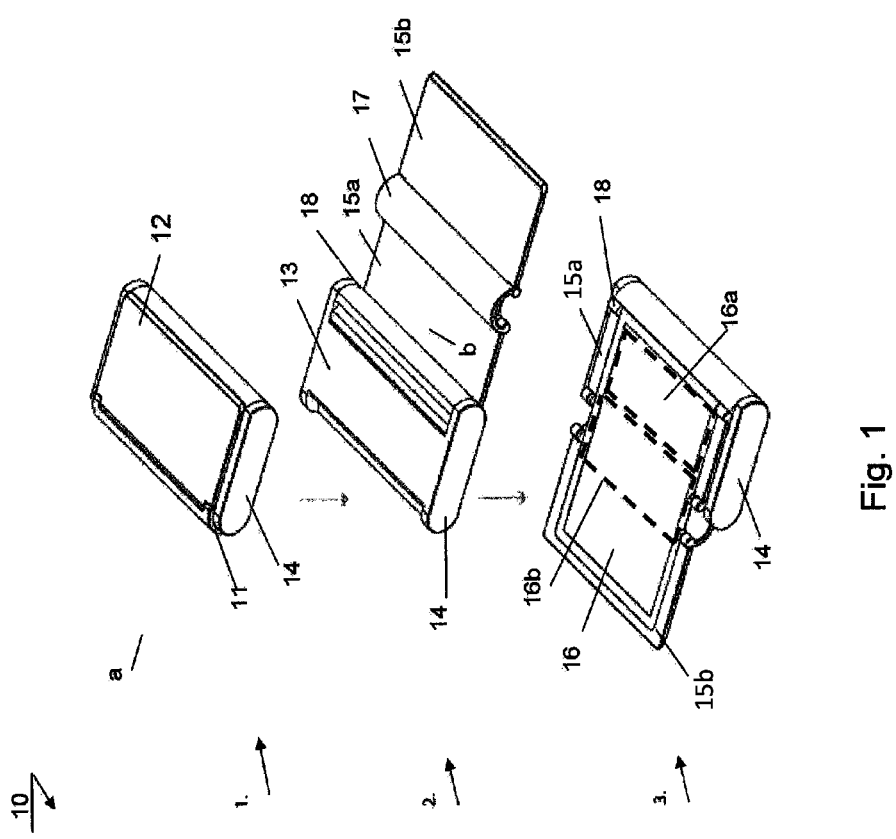
FIG. 1, including views 1-3, presents schematic views of an embodiment of the electronic apparatus according to the invention.

FIG. 1 presents a schematic view of an embodiment of the electronic apparatus according to the invention. The electronic apparatus 10 according to the invention comprises a body 14 about which a suitable cover 12 is wrapped. The cover 12 may be used to support a collapsible flexible display 16 of the electronic apparatus. In accordance with steps 1, 2, 3 which may be followed by a user to set the electronic apparatus 10 in a working mode, at step 1 the cover 12 is unfolded about a hinge 11 in a direction schematically indicated by the arrow "a". Preferably, a 180 degree rotation is envisaged. After this the cover 12 stretches out having two substantially rigid flaps 15a 15b interconnected by a hinge 17. In accordance with the invention the body 14 comprises a touch-sensitive area 13 which may be dimensioned as desired. For example a dimension of the touch-sensitive area 13 can occupy a full area of a corresponding face the body 14, or it may occupy a portion of the corresponding face of the body. At step 2 the cover is further rotated with respect to the body 14 about a hinge 18 in a direction indicated by the arrow b. Preferably, a further 180 degree rotation is envisaged. As a result, at least a portion 16a of the collapsible flexible display 16 is positioned overlaying the touch-sensitive portion 13 of the body 14 of the electronic apparatus 10. It will be appreciated that although FIG. 1 schematically depicts an area 16b wherein the collapsible flexible display 16 undergoes deformation, it is possible that a plurality of such areas is provided.

Figure 2:
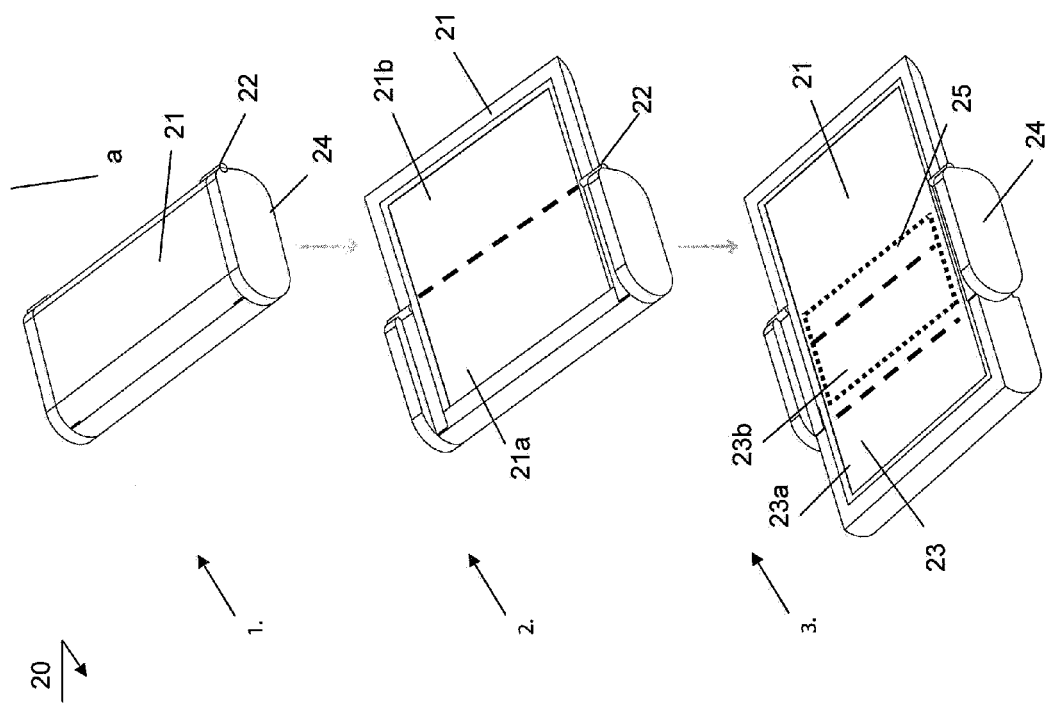
FIG. 2, including views 1-3, presents schematic views of a further embodiment of the electronic apparatus according to the invention.

FIG. 2 presents a schematic view of a further embodiment of the electronic apparatus according to the invention. The electronic apparatus 20 comprises a body 24 about which a cover 21 is wrapped. The cover 21 may be unfolded at step 1 in a direction indicated by arrow "a" undergoing rotation about a hinge 22. In this particular embodiment the cover 21 has such portions 21a, 21b, 23a, 23b that first a partial viewing of the display is enabled. As a result a collapsible flexible display 21 is extended so that a first portion 21 having subportions 21a, 21b is extracted. The portions of the flexible display are preferably supported by the cover of the electronic apparatus 20. In accordance with the invention, the body 21 is provided with a touch-sensitive area. In this example the portion 21a is positioned above the touch-sensitive area (not shown) of the body enabling the user to input suitable alphanumerical information, if desired. In cases where the user wishes to view a full screen display, the flexible display can be extended further from a storage position in the body 24 so that both the first portion 21 and a second portion 23 are extended. In this case a different area 25 of the flexible display is positioned above the touch-sensitive area of the body 24. Preferable, the electronic apparatus 20 is arranged to automatically track which portion of the display is overlaying the touch-sensitive area so that suitable touch buttons of the user interface are projected on such portion. For example, in cases where the portions 21, 23 are arranged to open as a book and slide, the touch interface may be incorporated in the sliding part. Alternatively, the user interface may have a function to scroll the touch buttons over the display screen to position their image at the portion of the flexible display overlaying the touch sensitive area.

Figure 3:
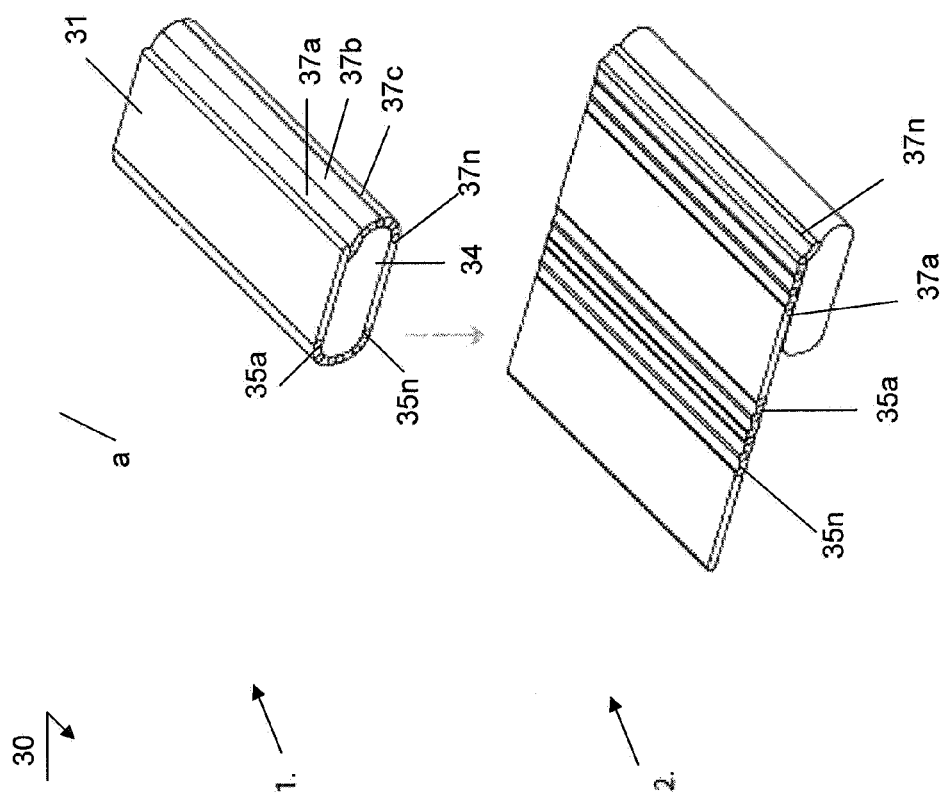
FIG. 3, including views 1-2, presents schematic views of a still further embodiment of the electronic apparatus according to the invention.

FIG. 3 presents a schematic view of a still further embodiment of the electronic apparatus according to the invention. The electronic apparatus 30 comprises a body 34 about which a cover 31 is wrapped. The cover 31 may comprise a suitable plurality of suitably dimensioned segments which are interconnected by a plurality of elongated hinges 35a . . . 35n and 37a . . . 37n, which are arranged as respective sequences. When the cover 31 is conceived to be opened, the user displaces the cover 31 with respect to the body 34 in a direction indicated by arrow "a". Preferably, a collapsible flexible display (not shown) of the apparatus 30 is attached to the cover 31 and is unwrapped together with it. At step 2 a portion of the collapsible flexible display is straightened. This embodiment has an advantage that the plurality of sequential hinges 35a . . . 35n and 37a . . . 37n restricts a minimum bending angle of the display on one hand and flattens the flexible display on the other hand, leading to improved durability of the electronic display. In addition, the said plurality of hinges may be arranged to support a substantially full 360 degree rotation compared to a single hinge embodiment, as is shown, for example in FIG. 1. This has an advantage of providing a compact mechanical construction for a substantial 360 degree rotation, still further improving durability and user friendliness of the apparatus 30.

Figure 4:
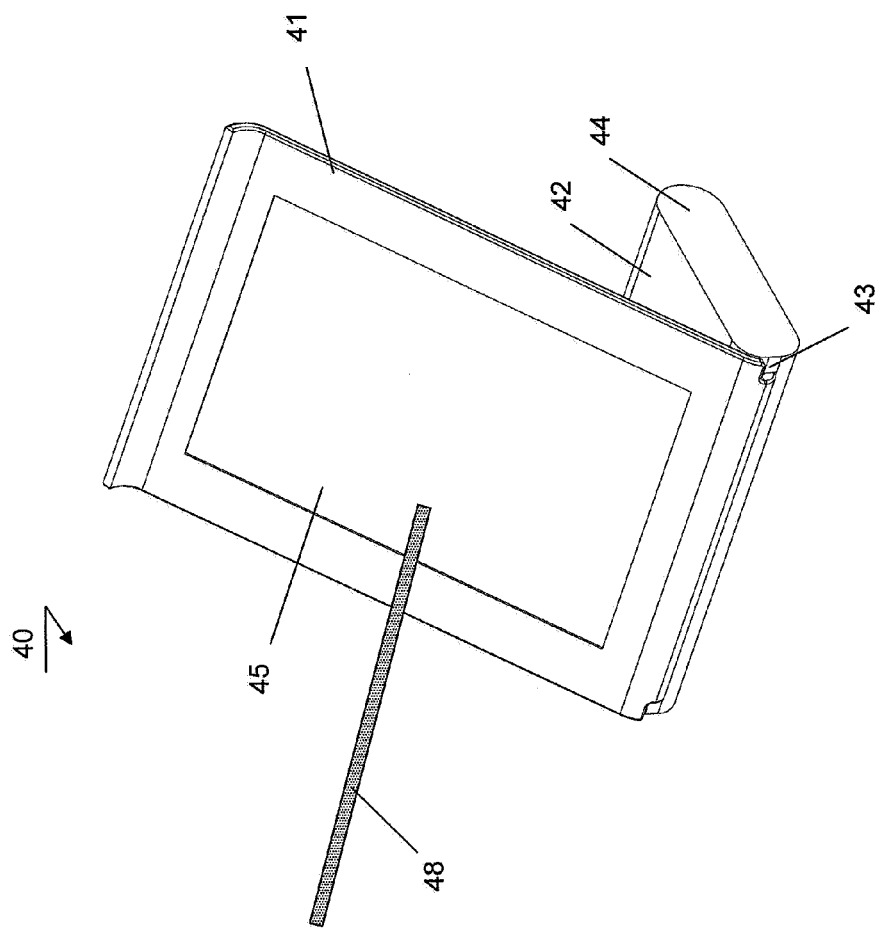
FIG. 4 presents a schematic view of a still further embodiment of the electronic apparatus according to the invention.

FIG. 4 presents a schematic view of a further embodiment of the electronic apparatus according to the invention. An electronic apparatus 40 according to the invention comprises a body 44 provided with a touch-sensitive area 42 conceived to cooperate with a collapsible flexible display 45. Preferably, in this embodiment a suitable contactless touch-sensitive device is used. For example, operation of such device may be based on EM radiation whereby a stylus 48 provided with suitable EM antennas undergoes energy exchange with suitable coils of the touch-sensitive unit 42. This principle of operation is known per se and forms part of knowledge of the person skilled in the art. Preferably, the flexible display 45 is affixed/arranged upon a rigid flap 41 supporting the display 45, said flap being rotatable about a hinge 43. The flap 41 may have a suitable plurality of segments separated by hinges 43. It will be appreciated that it is possible to envisage an electronic device wherein a single revolution or plural revolutions of the flexible display 45 together with the flap 41 about the body 44 are enabled. Advantageously, the body 44 acts as a support for the display 45 improving viewing characteristics of the electronic apparatus 40 as a whole.

Figure 5:
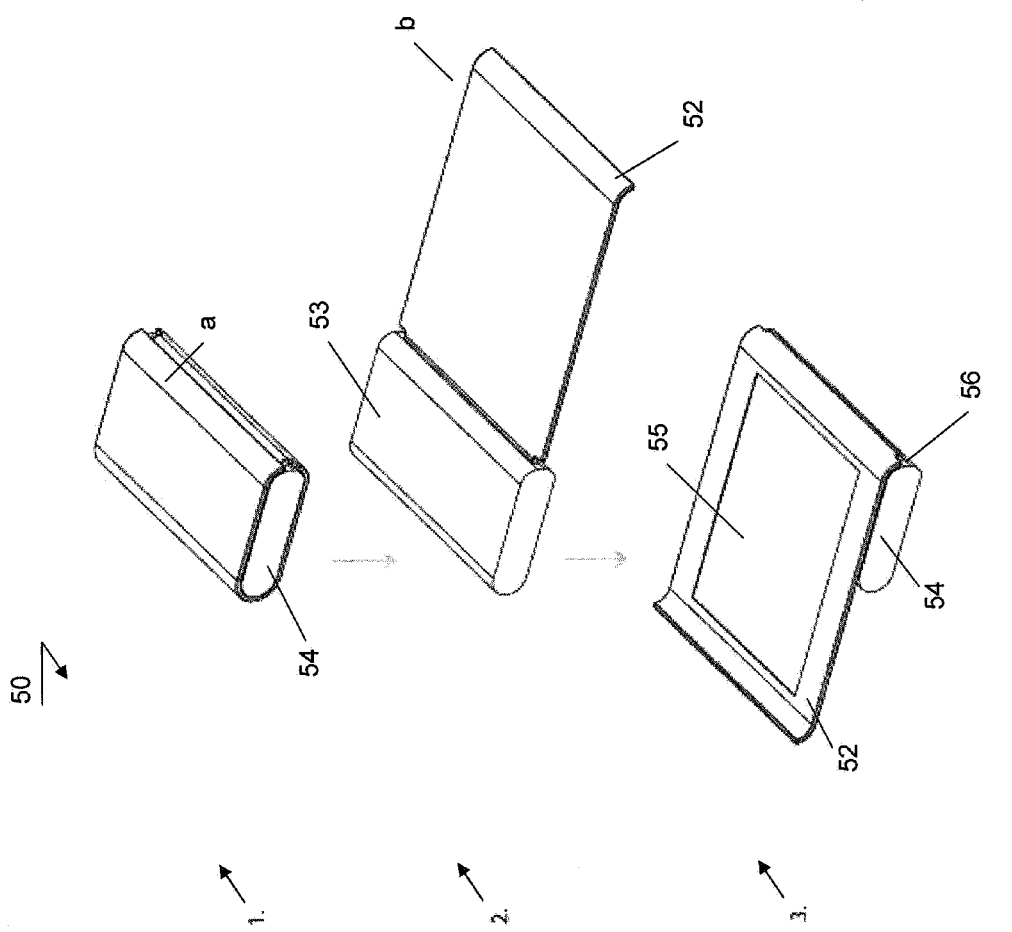
FIG. 5, including views 1-3, presents schematic views of a still further embodiment of the electronic apparatus according to the invention.

FIG. 5 presents a schematic view of a still further embodiment of the electronic apparatus according to the invention. The electronic apparatus 50 according to the invention comprises a body 54 about which a flexible cover 52 is wrapped. The flexible cover may undergo one or more revolutions about the body 54. The body 54 is provided with a touch-sensitive area 53 which may cover a portion of a face of the body or the whole face of the body. In operation, the cover 52 is unfolded in accordance with arrows "a" and "b" yielding a fully extended display 55 supported by the flexible cover 52. As a result of a revolution of the flexible cover 52 about a hinge 56, a suitable portion of the flexible display 55 is positioned overlaying the touch-sensitive area 53. Preferably, the flexible cover is used as a back protection means for protecting the display from mechanical damage caused by pressing it against the touch sensitive area 53 of the body 54.

Figure 6:
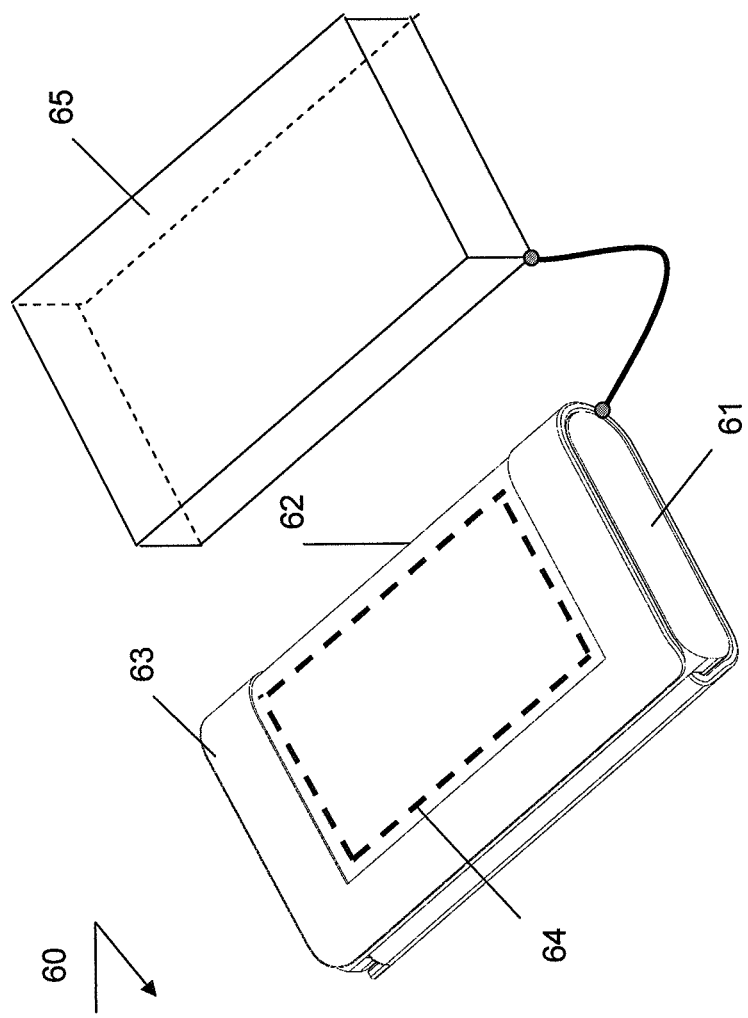
FIG. 6 presents a schematic view of an embodiment of the electronic apparatus provided with a display facing outwardly.

In a further embodiment of the electronic apparatus 60 according to the invention, schematically shown in FIG. 6, a flexible display 62 is wrappable about the body 61 of the apparatus 60 facing outwardly. Touch sensitive area 64 may be provided on the body 61 to substantially correspond in its overall dimension with an overlaying area of the display 62. In order to protect the display 62 from mechanical damage on the periphery, suitable edge protectors 63 may be used. It will be appreciated that the edge protectors may form part of a cover material of the electronic apparatus 60, or may form part of a flexible display stack and may be manufactured together with it. The display 62 is fixed to the body 61 using magnets, or other suitable mechanical means, like indications in the hinges. This particular embodiment of the electronic apparatus according to the invention has an advantage that the electronic device 60 may be used while the display 62 is being wrapped about the body 61, which saves space and is user friendly. In order to protect the display area from mechanical or other damage a removable cover 65 may be provided. Preferably, the cover is flexible and transparent so that the user may interact with the apparatus while keeping the cover on. This may find application in simple interactions, like engaging in a conversation, checking incoming e-mail or other messages, actuating camera function, or any other similar application when a limited number of touch buttons has to be actuated and when a limited time is spent on studying the display. In cases where the user desires to elaborately engage with the electronic apparatus 60, the user may take off the cover 65 and proceed accordingly. It will further be appreciated that the body 61 may also comprise a touch sensitive area at a rear surface, not shown in this figure. The user may then engage with the apparatus 60 using both the front touch sensitive area 64 and the rear touch sensitive area (not shown). This functionality saves time of the user and saves space, and may be advantageous in certain circumstances. Alternatively or additionally, it is also possible to arrange the flexible display so that the active area is facing outwardly in use and is facing downwardly upon storage.

Figure 7:
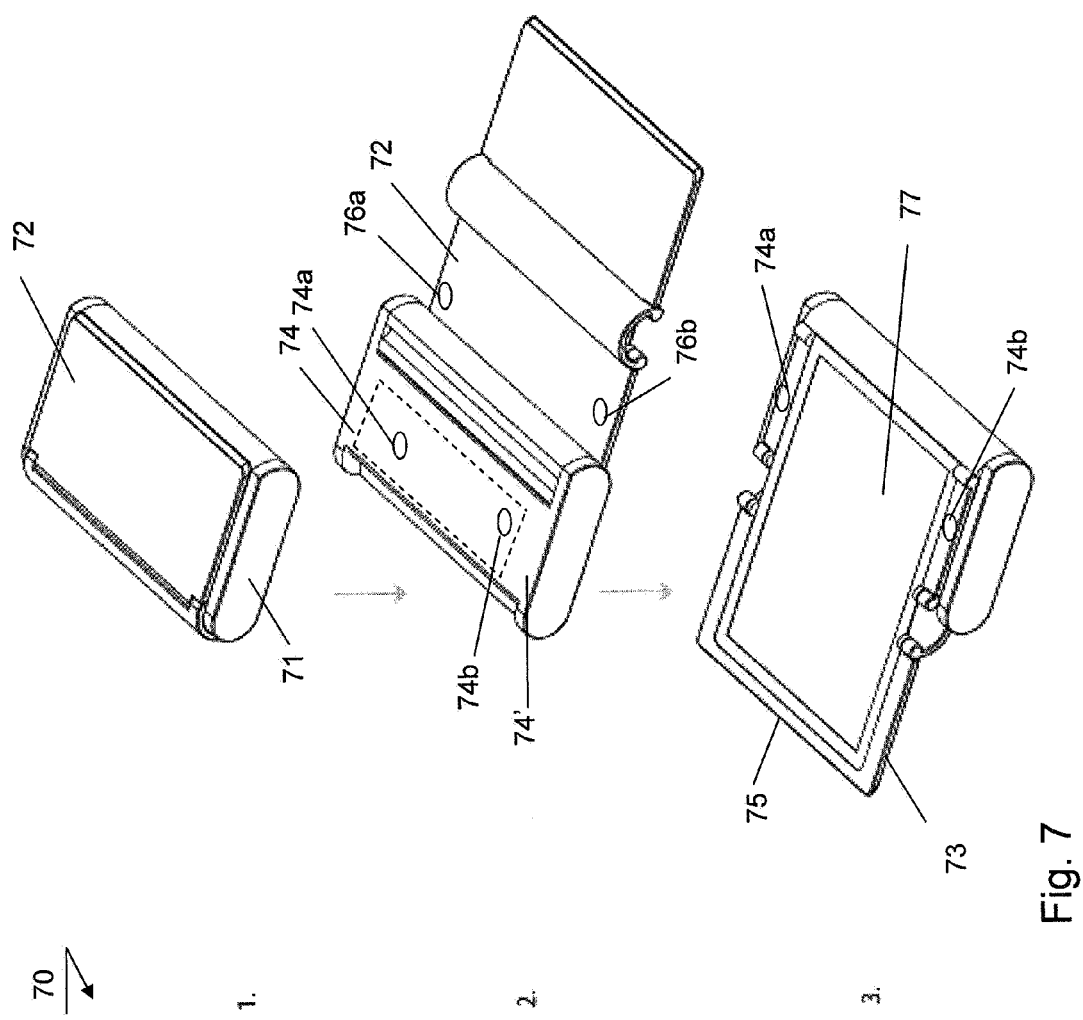
FIG. 7, including views 1-3, presents schematic views of an embodiment of the electronic device according to the invention provided with illumination means.

FIG. 7 presents a schematic view of an embodiment of the electronic device according to the invention provided with illumination unit. The electronic apparatus 70 comprises a body 71 where about a flap 72 may be revolved in use. The revolution of the flap is schematically illustrated using steps 1-3. At step 1 the flap 72 is completely rolled about the body 71. Upon use of the electronic apparatus 70, for example, for purposes of viewing a flexible display (not shown) attached to the flap 72, at step 2 the flap will be revolved about the body 71 so that the light sources 74a, 74b, which may be integrated with the body 71, are seen. The light sources may be conceived to be positioned below a portion 74 conceived to be used for enabling touching functionality. Alternatively, the light sources are positioned anywhere on the surface 74'. Preferably, suitable displacement means are used for displacing the flaps, the displacement means being mechanically or electronically coupled to the illumination unit for synchronizing a displacement of the illumination unit with a displacement of the flaps. The flap 72 comprises corresponding openings 76a, 76b conceived to cooperate with the light sources 74a, 74b when the flap 72 is properly positioned on the body 71 (step 3). In order to enable front lighting of the flexible display 77, the light sources 74a, 74b may be constructed to cooperate with light guides 75 which may run along respective edge portions of the flap 72 to couple light to the openings 76a, 76b. It will be appreciated that although a reference is made to the openings, the embodiment is not limited to voids, as providing suitable filters or transparent screens is contemplated as well.

In addition, the electronic device as is discussed with reference to the foregoing may comprise a device body, an at least partially flexible display, cooperating with the device body, and an illuminator for illuminating at least part of the display, wherein the illuminator may be provided along an edge portion of the display. The edge portion of the display may be rigid, flexible or partially rigid and partially flexible. Preferably, the illuminator comprises a number of electrically interconnected light sources, integrated in the edge portion of the display. Additionally or alternatively, the illuminator comprises a light guide, which is arranged to emit light along at least a part of its length. Preferably, the light guide comprises a number of optically coupled light guiding segments. The light guide may be arranged to run along the edge of the flexible display. Additionally, or alternatively, the illuminator comprises a strip of light emissive material. Still alternatively, the light guide is arranged with light transmissive walls for emitting light along at least a part of its length. Still alternatively, the illuminator may be provided with non-transmissive walls arranged with transmissive regions. The illuminator is constructed to be displaced together with the edge of the flexible display. In cases where the edge is flexible, the light guide may be constructed to be flexible as well. In this way, for rollable or wrappable flexible displays, the illuminator may follow rolling or wrapping movement of the portion of the display it is cooperating with or it is connected to. The light may be generated by a suitable light source, which may be preferably positioned in the body of the electronic apparatus.

Figure 8:
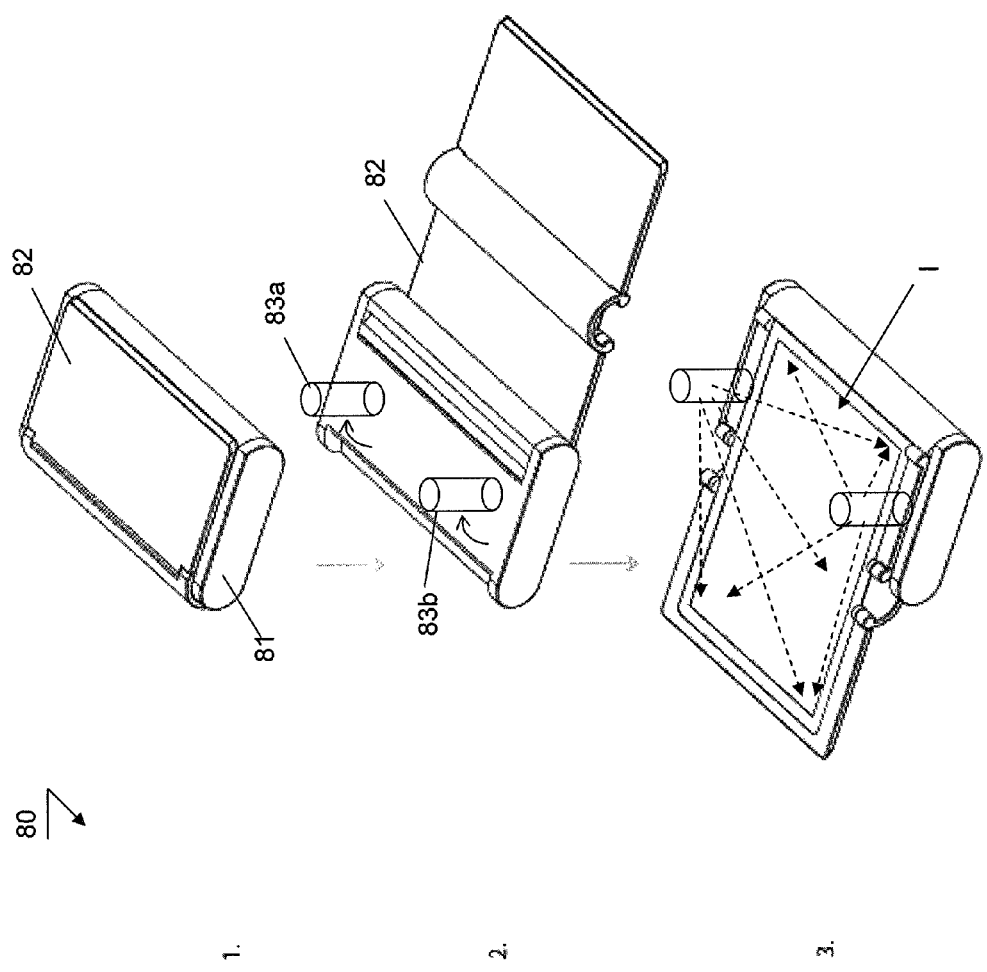
FIG. 8, including views 1-3, presents schematic views of an embodiment of the electronic device according to the invention provided with displaceable illumination means.

FIG. 8 presents a schematic view of an embodiment of the electronic device according to the invention provided with displaceable illumination unit. Similar to the embodiment shown in FIG. 7, the electronic apparatus 80 according to the present embodiment comprises a body 81 where about a flap 82 is revolved in use. The revolution of the flap is schematically illustrated using steps 1-3. At step 1 the flap 82 is completely rolled about the body 81. Upon use of the electronic apparatus 80, for example, for purposes of viewing a flexible display (not shown) attached to the flap 82, at step 2 the flap is revolved about the body 81 so that the displaceable light poles 83a, 83b are brought into a substantially protruded position, as schematically shown by arrows. The light poles may be conceived to be normally stored in a hidden position, for example within suitable cavities provided on a surface of the body 82 (not shown). Alternatively, the light poles may be positioned anywhere on the surface 84'. Additionally or alternatively, the light poles may be positioned on an area including, but not limited to the area conceived to be used for touch functionality. The flap 82 comprises corresponding openings 86a, 86b conceived to cooperate with the light poles 83a, 83b when the flap 82 is properly positioned one the body 81 (step 3). This embodiment has an advantage with respect to the embodiment shown in FIG. 7 in that no power lines or light sources need to be integrated into a flap or the body of the electronic apparatus.

It will be appreciated that although specific embodiments of the electronic device according to the invention are discussed separately for clarity purposes, interchangeability of compatible features discussed with reference to isolated figures is envisaged. While specific embodiments have been described above, it will be appreciated that the invention may be practiced otherwise than as described. For example, the flexible display may be arranged with its active area facing the body or being outwardly oriented with respect to the body. The descriptions above are intended to be illustrative, not limiting. Thus, it will be apparent to one skilled in the art that modifications may be made to the invention as described in the foregoing without departing from the scope of the claims set out below.

The invention claimed is:
1. An electronic apparatus comprising:
a body;
an at least partially collapsible flexible display, including a first portion and a second portion, disposed on opposite sides of the flexible display, wherein the first portion overlays a portion of the body in a folded state, and the second portion overlays the portion of the body in an extended state; and one or more rigid flaps, comprising displacement means for positioning a portion of the flexible display on the portion of the body when the electronic apparatus is in use;

wherein the flexible display is arranged to be wrapped about the body and the portion of the body is arranged with an illumination unit, wherein said displacement means are coupled to the illumination unit for synchronizing a displacement of the illumination unit with a displacement of said one or more flaps.

2. The electronic apparatus according to claim 1, wherein the portion of the body comprises a touch sensitive unit.

3. The electronic apparatus according to claim 1, wherein the illumination unit is displaceable with respect to the body.

4. The electronic apparatus according to claim 1, wherein the displacement means are arranged to rotate the one or more flaps with respect to the body.

5. The electronic apparatus according to claim 4, wherein said one or more flaps are provided with fixing means for retaining the portion of the flexible display on the portion of the body.

6. The electronic apparatus according to claim 1, wherein the displacement means comprises a plurality of hinges arranged in mutual sequence.

7. The electronic apparatus according to claim 6, wherein the plurality of hinges is arranged to restrict a bending angle of the flexible display.

8. The electronic apparatus according to claim 1, wherein said one or more rigid flaps are slidably arranged with respect to the body.

9. The electronic apparatus according to claim 1, wherein said one or more rigid flaps are arranged to be positioned at an oblique angle with respect to the body when the electronic apparatus is in use.

10. The electronic apparatus according to claim 1, wherein the flexible display is arranged to be wrapped about the body.

11. The electronic apparatus according to claim 10, wherein an active area of the flexible display is arranged to be outwardly arranged with respect to the body when the flexible display is in use.

12. The electronic apparatus according to claim 11, wherein the active area of the flexible display is arranged to be inwardly oriented upon storage.

* * * * *